E. D. BRAINARD.
Preserving Process.
No. 66,786.  Patented July 16, 1867.
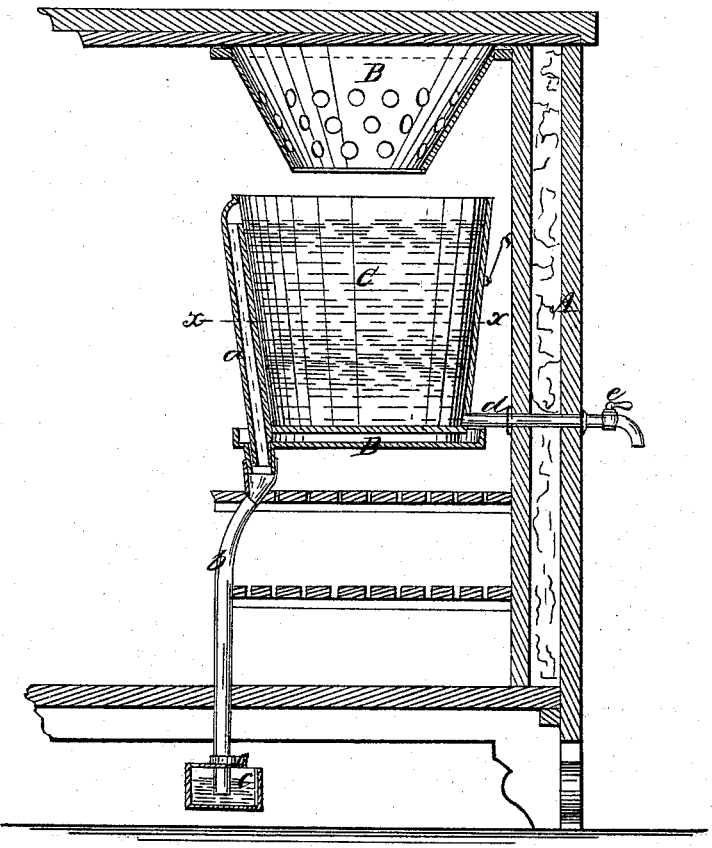
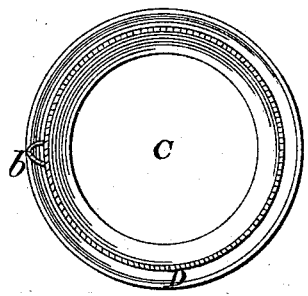
Witnesses:  Inventor:

UNITED STATES PATENT OFFICE.

EDWIN D. BRAINARD, OF ALBANY, NEW YORK.

IMPROVED MODE OF DRYING AND PURIFYING AIR FOR PRESERVING ANIMAL AND VEGETABLE SUBSTANCES.

Specification forming part of Letters Patent No. 66,786, dated July 16, 1867.

*To all whom it may concern:*

Be it known that I, EDWIN D. BRAINARD, of Albany, in the county of Albany and State of New York, have invented a new and Improved Method of Drying and Purifying the Air in a Close Chamber at a Low Temperature, for preserving animal and vegetable substances; and I do hereby declare that the following is a full, clear, and exact description thereof, which will enable others skilled in the art to make and use the same, reference being had to the accompanying drawings forming part of this specification, in which—

Figure 1 represents a sectional view of an apparatus or refrigerator for the application of my improved mode of drying and purifying the air therein for preserving animal and vegetable substances. Fig. 2 is a cross-section of the condensing-vessel, taken in the line $x$ $x$, Fig. 1.

Similar letters of reference indicate corresponding parts.

The object of this invention is to deprive the atmosphere in a close chamber of its moisture at a low temperature by means of condensation upon a cold surface, and the collection and conveyance of the water of condensation therefrom outside of such close chamber without the admission of air. This object may be accomplished by apparatus of various forms of construction, and by the use of different refrigerating substances; but ice is probably the cheapest and best refrigerating substance that can be employed, and it may be applied advantageously upon the plan hereinafter described.

The practical application and uses of my improvement consist in the preservation of vegetables, fruits, meats, butter, and animal or vegetable substances of all kinds upon a large or small scale, either for the domestic convenience of a family with an ordinary box refrigerator, or the commercial profit of capital with extensive store-houses.

A represents a box or chamber, designed to be made nearly air-tight, and surrounded with non-conductors of heat, with double walls, in the ordinary mode of construction of refrigerators or ice-houses. B represents a vessel or box for holding ice, having perforated sides and bottom. C is a metal vessel placed below the ice-holder B, for receiving the water formed by the melting of the ice, and acting as a condenser of the moisture of the atmosphere within the chamber, as hereinafter described. D is a collecting-vessel placed below the condenser C, for the purpose of receiving the water of condensation therefrom. The condensing and collecting vessels C D are suspended in such a manner that they shall not touch the sides of the chamber, and the whole apparatus may be made detachable. A pipe, $a$, leads from the condenser C at any point below its top, for the purpose of conveying off the excess of water it may receive from the ice-box B. The pipe $a$ leads into a pipe, $b$, which also communicates with the collector D, and conveys off from it the water of condensation received from the condenser C. The pipe $b$ passes through the bottom of the chamber A, and the lower end thereof is provided with an overflow cap or shoe, $c$, which shuts out the air by the immersion of the end of the pipe in water. A pipe, $d$, is inserted in the condenser C, provided with a cock, $e$, to draw off the water therefrom when necessary.

With an apparatus of this description the atmosphere inclosed in a close or air-tight chamber is deprived of its moisture at a low temperature in the following manner: It is a well-known law of nature that the moisture contained in the atmosphere will condense on the surface of an object colder than the atmosphere itself, and in proportion to the intensity of the cold of the object. Hence, a vessel containing ice or ice-cold water will take up and condense upon its sides the moisture of the atmosphere surrounding it. If a vessel or vessels containing ice or ice-cold water be inclosed in an air-tight chamber, the atmosphere contained therein will be deprived of its moisture by its condensation into water upon the surface of the vessel or vessels; and if provision be made for collecting and conveying away from the close chamber the water of condensation as rapidly as it is formed, the atmosphere in the chamber will then attain a high degree of dryness. This object is accomplished by the apparatus hereinbefore described. The air contained in the close chamber A will give up its moisture to the vessel B, and the vessel C containing the ice-water received from B. The excess of water formed by the melting of the ice and condensation in the vessel B will run off through the pipe $a$ into the pipe $b$, and the water of condensation formed on the surface of the vessel C will drip into the collecting vessel or pan D, and run off thence through the pipe $b$, to be discharged outside of the close chamber A into the overflow-box $c$, which shuts out the external air.

It will be observed that the vessel C, containing ice-water, will present a colder surface than the collecting-vessel D, and consequently, by virtue of the natural law of condensation, by which the colder surface of an object will act as a condensing medium on the surrounding atmosphere, the vessel C, in connection with the ice-box B, will take up and condense the moisture of the air in the chamber A, while the collecting-vessel D will remain dry externally, being of the same temperature as the air itself.

What is true of the effect of condensation on the colder surface of the vessel C in regard to the collecting-vessel D is also true in regard to the walls and ceiling of the close chamber, and of the shelves it may contain for holding fruits or other objects of preservation, and of the animal and vegetable substances themselves. The surfaces of all these things within the chamber, besides the vessels containing ice or ice-water, will yield up their moisture with that of the atmosphere surrounding them, and they will be dry.

Hereupon it will be seen that, by the constant escape of the water of condensation as rapidly as it is formed, and the absolute exclusion of the external air by the devices before described, the operation of condensation will go on continuously and uninterruptedly so long as the atmosphere or the surface of the objects within the chamber are surcharged with moisture; hence fruits, eggs, or other articles contained in a close chamber provided with a condensing apparatus, and the means of conducting off from the chamber the water of condensation, while the external air is excluded, will be deprived of excessive moisture on their surfaces, and be in fact dry, while at the same time, being kept at a low temperature, they will be subjected to the two conditions of coldness and dryness, which, when combined, afford the most effective means of preserving animal and vegetable substances from decay.

By this method of drying the atmosphere of a close chamber the air is also purified, by extracting from it all extraneous elements of a deleterious character.

When fruits, eggs, or other animal and vegetable substances are introduced into a chamber for preservation, they carry with them more or less impurities, which, if allowed to remain, will work the destruction of the mass. These impurities thus introduced into the close chamber pervade the atmosphere, and, being taken up and held by the moisture therein, are removed with it when it is condensed, and conveyed away from the chamber with the water of condensation, as before described. These impurities are likewise removed to a great extent by the water in the condenser C, and conveyed away also by the overflow therefrom, in the manner previously described.

My invention is not limited to the particular arrangement of apparatus for effecting the objects in view, as herein described, as various mechanical devices and combinations may be employed for the same purpose without deviating from the principle and essential features and plans of my invention.

Instead of introducing an ice-box within the close chamber, the ice may be kept outside of it, and the ice-water formed by the melting thereof may be conveyed by a pipe into the chamber and the condensing-vessel, provision being made for its introduction without external air by means of an inverted siphon on the pipe, or other effective device. Ice-water thus introduced into a close chamber will reduce the temperature therein as low as desired for the preservation of animal and vegetable substances, while, at the same time, it will act as effectually in the condensing-vessel for drying the atmosphere as if the ice itself were within the chamber. A series of connected or independent condensing-vessels may thus be supplied with ice-water from without for reducing the temperature and condensing the moisture of the air within a close chamber or a number of connected chambers.

Having described my invention, and the mode of carrying the same into operation, what I claim as new, and desire to secure by Letters Patent, is—

1. The improved method of drying and purifying the air in a close chamber at a low temperature, for preserving animal and vegetable substances, substantially as herein described.

2. The condenser C, the collecting-vessel D, the pipes $a\ b$, and the overflow-box $c$, or the equivalents of them, or either of them, in combination with a close chamber, A, when arranged to operate substantially as and for the purposes herein described.

The above specification of my invention signed by me this 11th day of June, 1867.

EDWIN D. BRAINARD.

Witnesses:
 WM. F. McNAMARA,
 ALEX. F. ROBERTS.